US011854366B1

(12) United States Patent
Thoma et al.

(10) Patent No.: US 11,854,366 B1
(45) Date of Patent: Dec. 26, 2023

(54) LEAK MONITORING SYSTEMS AND METHODS OF UTILIZING SAME

(71) Applicants: United States Environmental Protection Agency, Washington, DC (US); Flint Hills Resources Corpus Christi, LLC, Corpus Christi, TX (US); Molex, LLC, Lisle, IL (US)

(72) Inventors: Eben Daniel Thoma, Cary, NC (US); Deborah Lynn Preschler, Corpus Christi, TX (US); Roger John Hilarides, Wichita, KS (US); Debra Jean Cartwright, Sandia, TX (US); Michael Stephen Clausewitz, Corpus Christi, TX (US); Barry William Kelley, Edina, MN (US); David Randall Massner, Corpus Christi, TX (US); Wenfeng Peng, North Aurora, IL (US); Marko Frank Spiegel, Lafox, IL (US)

( * ) Notice: Subject to any disclaimer, the term of this patent is extended or adjusted under 35 U.S.C. 154(b) by 0 days.

(21) Appl. No.: 16/790,712

(22) Filed: Feb. 13, 2020

Related U.S. Application Data

(60) Provisional application No. 62/806,596, filed on Feb. 15, 2019.

(51) Int. Cl.
*G08B 21/12* (2006.01)
*G01M 3/04* (2006.01)
(Continued)

(52) U.S. Cl.
CPC ............... *G08B 21/12* (2013.01); *G01M 3/04* (2013.01); *G01W 1/02* (2013.01); *H04Q 9/00* (2013.01);
(Continued)

(58) Field of Classification Search
CPC .......... G08B 21/12; G01M 3/04; G01W 1/02; H04Q 9/00; H04Q 2209/40; H04Q 2209/823
See application file for complete search history.

(56) References Cited

U.S. PATENT DOCUMENTS

| | | | |
|---|---|---|---|
| 6,611,760 B2 * | 8/2003 | Bentley | B09B 1/00 702/2 |
| 6,723,990 B2 * | 4/2004 | DiDomenico | G01M 15/108 250/339.01 |

(Continued)

*Primary Examiner* — Amine Benlagsir (57) ABSTRACT

The present disclosure provides a leak monitoring system and associated method which is being configured to detect plumes of volatile organic compounds (VOC) as an alternative solution to the EPA Method 21, which measures VOC concentrations at the surface of each component. The leak monitoring system is a multi-layered system that includes monitoring performed by sensors that are fixed in place and sensors that are mobile. Each monitoring method is a layer and it complements and augments other layers. All the sensors wirelessly communicate with a central control through a gateway. The control unit further includes a software platform, which analyzes the data provided by the sensors in combination with other informetrics such as meteorological conditions and plant info to both identify the presence of a gas leak and to pinpoint a general location of the gas leak. When a significant gas leak is identified, the control unit sends an alert to plant managers via text or email, in addition to activating visual and/or audible alarms.

24 Claims, 8 Drawing Sheets

(51) Int. Cl.
 *H04Q 9/00* (2006.01)
 *G01W 1/02* (2006.01)
(52) U.S. Cl.
 CPC ... *H04Q 2209/40* (2013.01); *H04Q 2209/823* (2013.01)

(56) References Cited

U.S. PATENT DOCUMENTS

| | | | |
|---|---|---|---|
| 9,599,529 B1* | 3/2017 | Steele | G01N 25/20 |
| 10,928,371 B1* | 2/2021 | Smith | G01N 33/0062 |
| 2011/0231099 A1* | 9/2011 | Elkins | E21B 47/07 |
| | | | 702/12 |
| 2012/0036242 A1* | 2/2012 | Wittenburg | H04L 67/12 |
| | | | 709/222 |
| 2014/0002639 A1* | 1/2014 | Cheben | G08B 21/14 |
| | | | 348/135 |
| 2016/0313237 A1* | 10/2016 | Young | G01N 35/00871 |
| 2017/0284887 A1* | 10/2017 | Miranda | G06K 9/4661 |
| 2018/0266944 A1* | 9/2018 | Waxman | G01J 3/44 |
| 2018/0292374 A1* | 10/2018 | Dittberner | G08G 5/0039 |
| 2019/0195848 A1* | 6/2019 | Mou | G01N 33/0063 |
| 2019/0302719 A1* | 10/2019 | Aljuaid | G08B 21/182 |
| 2019/0339158 A1* | 11/2019 | Yanai | G01M 3/38 |
| 2020/0228342 A1* | 7/2020 | Nixon | H04L 9/3236 |

* cited by examiner

LEAK MONITORING SYSTEMS AND METHODS OF UTILIZING SAME

RELATED APPLICATIONS

This application claims priority to U.S. Provisional Patent Application Ser. No. 62/806,596, filed Feb. 15, 2019, and herein incorporates by reference the aforementioned in its entirety.

This invention was made with Government support under Cooperative Research and Development Agreement (CRADA) #914-16 awarded by the United States Environmental Protection Agency. The Government has certain rights in the invention.

TECHNICAL FIELD

This disclosure relates to the field of monitoring systems, more specifically to the field of leak monitoring systems and methods of utilizing same.

DESCRIPTION OF RELATED ART

Fugitive emissions of volatile organic compounds ("VOCs") cause air pollutions and health and safety issues, in addition to product loss. During the 1980's and 1990's, legislation relating to reducing emissions was amended to include process plants, such as petroleum refineries and chemical manufacturing facilities. The United States Environmental Protection Agency ("EPA") began conducting audits and pursuing enforcement actions in these industries in hopes to reduce these emissions. Leak detection and repair ("LDAR") programs were instituted in order to help reduce emissions. In October 2007, the EPA issued a document entitled "Leak Detection and Repair—A Best Practices Guide". According to this document, the EPA has determined that leaking equipment, such as valves, pumps, and connectors, are the largest source of emissions of gases, such as volatile organic compounds and volatile hazardous air pollutants ("VHAPs"), from petroleum refineries and chemical manufacturing facilities.

VOCs contribute to the formation of ground-level ozone. Ozone is a major component of smog and may cause or aggravate respiratory disease. Many areas of the United States do not meet the National Ambient Air Quality Standard ("NAAQS") for ozone.

Some species of VOCs are also classified as Volatile Hazardous Air Pollutants (VHAPs). Some common VHAPs emitted from refineries and chemical plants include acetaldehyde, benzene, formaldehyde, methylene chloride, naphthalene, toluene, and xylene.

A typical refinery or chemical plant can emit hundreds of tons per year of VOCs from leaking equipment, such as valves, connectors, pumps, sampling connections, compressors, pressure-relief devices, and open-ended lines.

Valves are used to either restrict or allow the movement of fluids. Valves come in numerous varieties and, except for connectors, are the most common piece of process equipment in industry. Leaks from valves usually occur at the stem or gland area of the valve body and are commonly caused by failure of the valve packing or O-ring.

Connectors are components such as flanges and fittings used to join piping and process equipment together. Gaskets and blinds are usually installed between flanges. Leaks from connectors are commonly caused from gasket failures and improperly torqued bolts on flanges.

Pumps are used to move fluids from one point to another. Two types of pumps extensively used in petroleum refineries and chemical plants are centrifugal pumps and positive displacement, or reciprocating pumps. Leaks from pumps typically occur at the seal.

Sampling connections are utilized to obtain samples from within a process. Leaks from sampling connections usually occur at the outlet of the sampling valve when the sampling line is purged to obtain the sample.

Compressors are designed to increase the pressure of a gas and provide motive force. They can have rotary or reciprocating designs. Leaks from compressors most often occur from the seals.

Pressure-relief devices are safety devices designed to protect equipment from exceeding the maximum allowable working pressure. Pressure relief valves and rupture disks are examples of pressure relief devices. Leaks from pressure relief valves can occur if the valve is not sealed properly, operating too close to the set point, or if the seal is worn or damaged. Leaks from rupture disks can occur around the disk gasket if not properly installed.

Open-ended lines are pipes or hoses open to the atmosphere or surrounding environment. Leaks from open-ended lines occur at the point of the line open to the atmosphere and are usually controlled by using caps, plugs, and flanges. Leaks can also be caused by the incorrect implementation of the block and bleed procedure.

In a typical facility, most of the emissions are from valves and pumps because of moving parts inside. The major cause of emissions is seal or gasket failure due to normal wear or improper maintenance.

Facilities can control emissions from equipment leaks by implementing a LDAR program. LDAR is a work practice designed to identify leaking equipment so that emissions can be reduced through repairs. A component that is subject to LDAR requirements must be monitored at specified, regular intervals to determine whether it is leaking. Any leaking component must then be repaired or replaced within a specified period of time.

Alternatively, or in conjunction with a LDAR program, facilities can control emission from equipment leaks by modifying/replacing leading equipment with "leakless" or "seal less" components. Leakless and seal less components can be effective at minimizing or eliminating leaks, but their use may be limited by materials of construction considerations and process operating conditions. Installing leakless and seal less components can also be expensive and time-consuming, possibly even requiring a shut-down of all or a part of a facility.

LDAR programs are required by many federal, state and local requirements/standards/regulations ("Regulations"). Most of these Regulations require the implementation of a formal LDAR program using EPA Reference Method 21 (40 CFR Part 60, Appendix A) ("Method 21"). Facilities must also ensure that they are complying with the proper equipment leak Regulations if multiple Regulations apply. Emissions reductions from implementing a LDAR program potentially reduce product losses, increase safety for workers and operators, decrease exposure of the surrounding community, reduce emissions fees, and help facilities avoid enforcement actions.

While the requirements among the Regulations vary, all LDAR programs consist of five basic elements, namely: (1) identifying components; (2) leak definition; (3) monitoring components; (4) repairing components; and (5) recordkeeping.

Identifying components generally includes the following requirements: (a) assigning a unique identification (ID) number to each regulated component; (b) recording each regulated component and its unique ID number in a log; (c) physically locating each regulated component in the facility, verifying its location on the piping and instrumentation diagrams or process flow diagrams, and updating the log if necessary (some states require a physical tag on each component subject to the LDAR requirements); (d) identifying each regulated component on a site plot plan or on a continuously updated equipment log; and (e) promptly noting in the equipment log when new and replacement pieces of equipment are added and equipment is taken out of service.

As for leak definition, Method 21 requires VOC emissions from regulated components to be measured in parts per million ("ppm"). A leak is detected whenever the measured concentration exceeds the threshold standard (i.e., leak definition) for the applicable regulation. Leak definitions vary by regulation, component type, service (e.g., light liquid, heavy liquid, gas/vapor), and monitoring interval. Some regulations (e.g., New Source Performance Standards ("NSPS")) have a leak definition of 10,000 ppm, while other regulations (e.g., National Emission Standards for Hazardous Air Pollutants ("NESHAP")) use a 500 ppm or 1,000 ppm leak definition. Many equipment leak regulations also define a leak based on visual inspections and observations (such as fluids dripping, spraying, misting, or clouding from or around components), sound (such as hissing), and smell.

In connection with monitoring components, for many Regulations with leak detection provisions, the primary method for monitoring to detect leaking components is Method 21. Method 21 is a procedure used to detect VOC leaks from process equipment using a portable detecting instrument. Monitoring intervals vary according to the applicable regulation, but are typically weekly, monthly, quarterly, and yearly. The monitoring interval generally depends on the component type and periodic leak rate for the component type. In general, Method 21 requires three steps: (1) evaluating instrument performance; (2) calibrating instrument; and (3) monitoring individual components.

Evaluating instrument performance includes: (a) for each VOC measured, the response factor should be <10 unless specified in the applicable regulation. Response factor is the ratio of the known concentration of a VOC compound to the observed meter reading when measured using an instrument calibrated with the reference compound specified in the applicable regulation; (b) the calibration precision should be <10 percent of the calibration gas value. Calibration precision is the degree of agreement between measurements of the same known value, expressed as the relative percentage of the average difference between the meter readings and the known concentration to the known concentration; and (c) the response time should be <30 seconds. Response time is the time interval from a step change in VOC concentration at the input of the sampling system to the time at which 90% of the corresponding final value is reached as displayed on the instrument readout meter.

Calibrating instrument includes performing the following before each monitoring episode: (a) letting the instrument warm up; (b) introducing the calibration gas into the instrument probe; and (c) adjusting the instrument meter readout to match the calibration gas concentration value.

Monitoring individual components includes: (a) placing the probe at the surface of the component interface where leakage could occur; (b) moving the probe along the interface periphery while observing the instrument readout; (c) locating the maximum reading by moving the probe around the interface; (d) keeping the probe at the location of the maximum reading for two times the response factor; and (e) if the concentration reading on the instrument readout is above the applicable leak definition, then the component is leaking and must be repaired.

Repairing components generally includes the following requirements: (a) repairing leaking components as soon as practicable, but not later than a specified number of calendar days after the leak is detected; (b) if the repair of any component is technically infeasible without a process unit shutdown, the component may be placed on the Delay of Repair list, the ID number is recorded, and an explanation of why the component cannot be repaired immediately is provided. An estimated date for repairing the component must be included in the facility records; and (c) the component is considered to be repaired only after it has been monitored and shown not to be leaking above the applicable leak definition.

Recordkeeping, for each regulated process, includes: (a) maintaining a list of all ID numbers for all equipment subject to an equipment leak regulation; (b) for valves designated as "unsafe to monitor," maintaining a list of ID numbers and an explanation/review of conditions for the designation; (c) maintaining detailed schematics, equipment design specifications (including dates and descriptions of any changes), and piping and instrumentation diagrams; and (d) maintaining the results of performance testing and leak detection monitoring, including leak monitoring results per the leak frequency, monitoring leakless equipment, and non-periodic event monitoring.

Recordkeeping, for leaking equipment, includes: (a) attaching ID tags to the equipment; (b) maintaining records of the equipment ID number, the instrument and operator ID numbers, and the date the leak was detected; (c) maintaining a list of the dates of each repair attempt and an explanation of the attempted repair method; (d) noting the dates of successful repairs; and (e) including the results of monitoring tests to determine if the repair was successful.

Attempts have been made to make improvements in LDAR programs. One specific area of desired improvement is in connection with the monitoring of individual components. A single process plant can have hundreds of thousands of components, each of which must be monitored for leakage. While the manual use of a probe is an effective way of monitoring the components for leaks, the manual use has several disadvantages associated with it. More specifically, the manual use of a probe is typically performed by a large pool of skilled labor and/or technicians and, thus, tends to have high associated costs to execute, especially as the manual use of a probe to monitor hundreds of thousands of components can be rather time consuming. Furthermore, many VOC leaks are not timely detected due to fixed monitoring schedules, e.g., the time interval between when a certain component is required to be monitored using Method 21.

In an effort to promote efficiency and reduce costs, gas detection cameras based on infrared absorption have been developed to quickly scan components. Examples are FLIR model GF300 & 320, and Opgal model EyeCGas. These infrared cameras are fast in identifying locations of large leaks, but they do not provide quantitative results and they do not offer the same level of sensitivity as conventional Method 21 instruments. Therefore, the EPA approved the use of gas imaging devices as an alternative work practice (AWP) but still requires refineries to perform inspections using a "sniffer" type instrument following Method 21.

There are many different systems/methods/technologies that are used for gas detection in many different fields, however none of these systems/methods/technologies have to date been used, either alone or in combination, to detect plumes of volatile organic compounds (VOC) as an alternative solution to the EPA Method 21.

As a result of the foregoing, certain individuals would appreciate further improvements in LDAR programs, including the use of leak detection monitoring systems and methods of utilizing same.

SUMMARY

In an embodiment, the present disclosure provides a leak monitoring system and associated method which is configured to be an alternative solution to Method 21. Instead of measuring gas concentrations at each component, it detects the presence of gas plumes created by the gas leaks. The leak monitoring system is a multi-layered system and includes monitoring performed by sensors that are fixed in place and sensors that are mobile. These sensors communicate with a control unit to provide information regarding the detection of VOCs. The control unit further includes informetrics and a dashboard software platform. Based on the stored informetrics and the dashboard software platform, the control unit analyzes the information provided by the sensors in order to both identify the presence of a VOC leak and to pinpoint a general location of the VOC leak. Once the VOC leak is detected and generally pinpointed, an operator can be dispatched to the general location in order to specifically pinpoint the specific component which has the VOC leak.

BRIEF DESCRIPTION OF THE DRAWINGS

The present disclosure is illustrated by way of example and not limited in the accompanying figures in which like reference numerals indicate similar elements and in which.

DETAILED DESCRIPTION

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
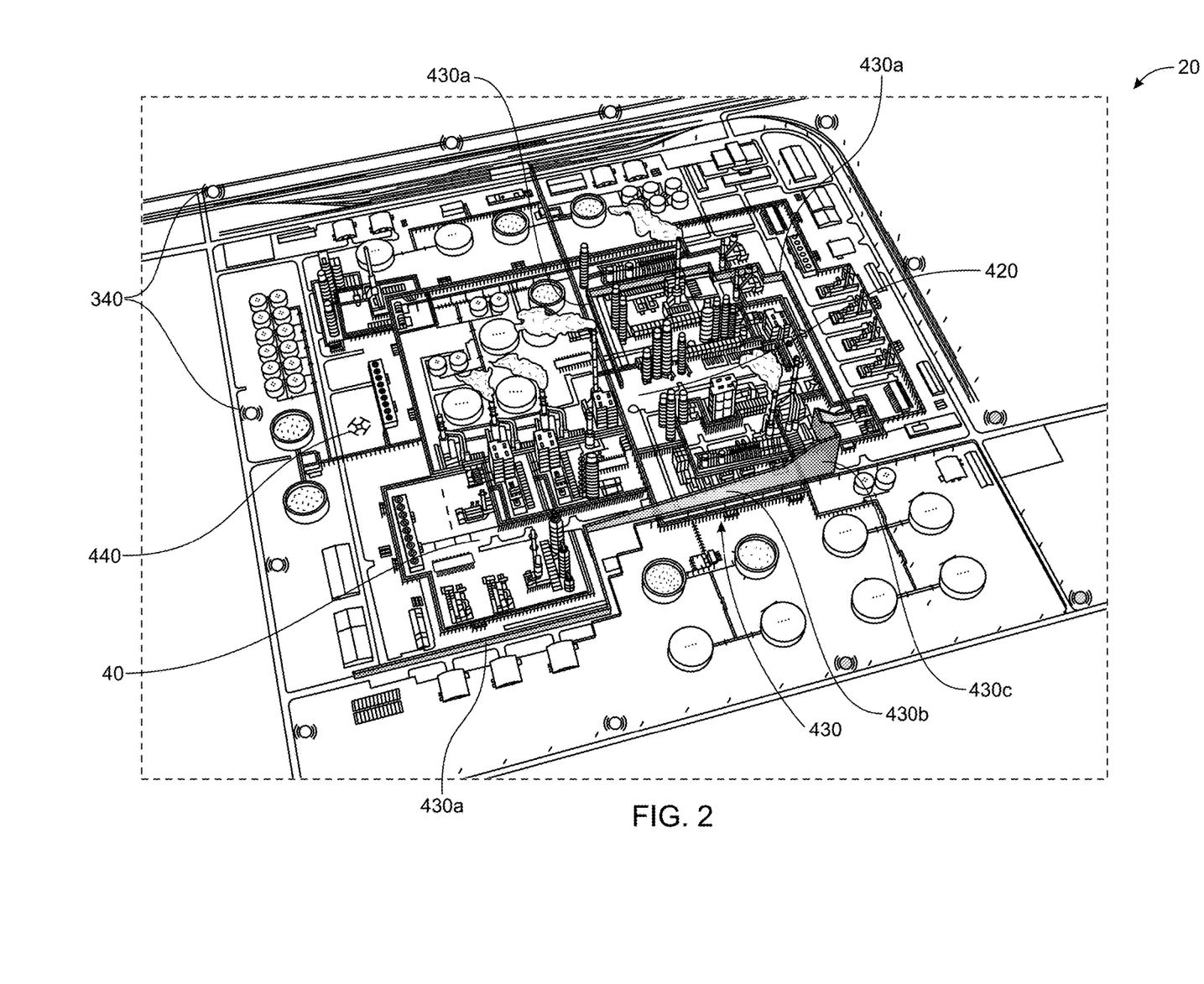
FIG. 2 illustrates a plant in which the leak monitoring system of FIG. 1 is deployed.
Figure 7:
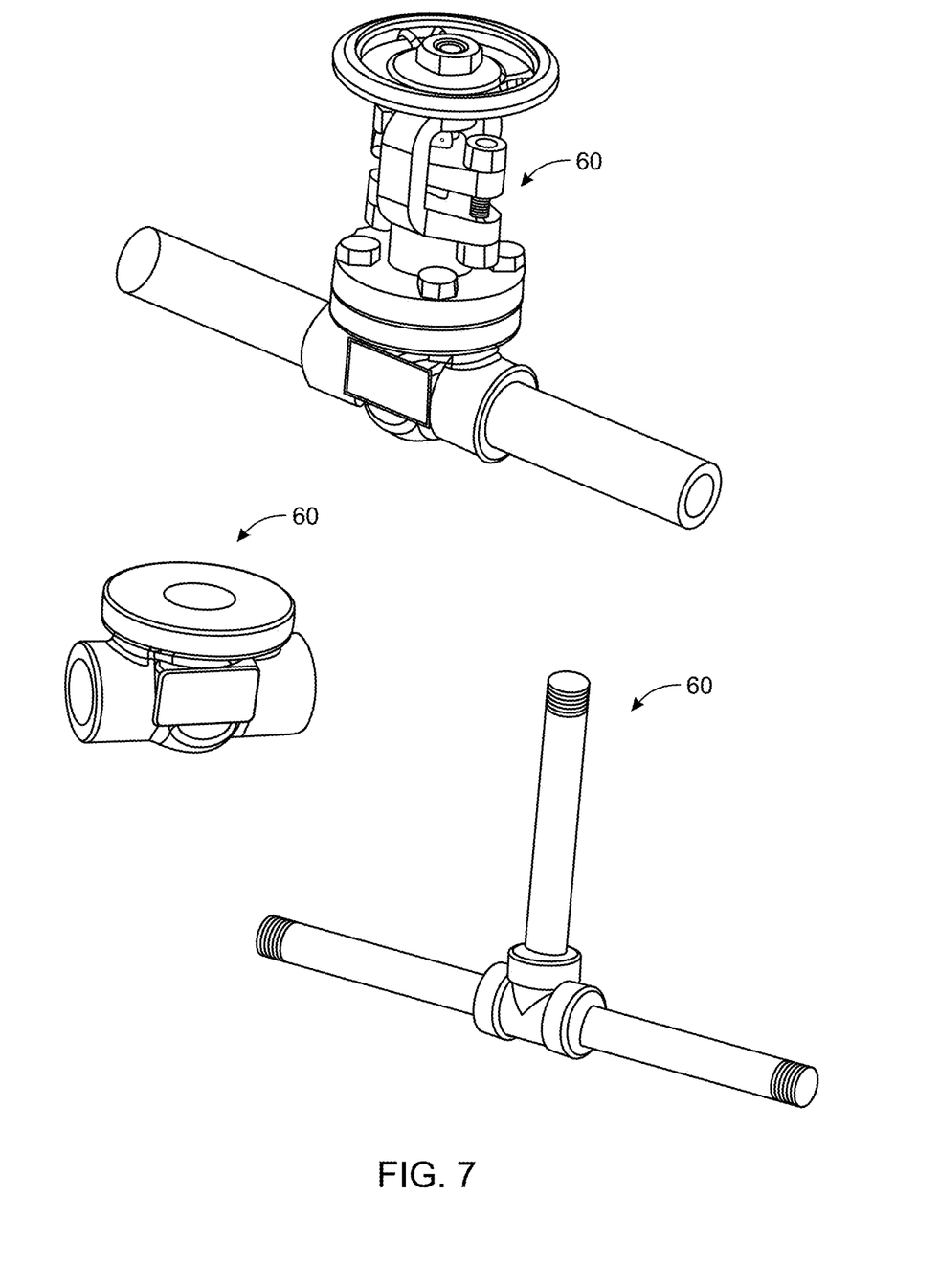
FIG. 7 illustrates various components of piping systems that are typically found in the plant illustrated in FIG. 2.

The present disclosure provides an embodiment of a leak monitoring system 100 which can be used to detect leaks occurring at various components 60 of piping systems 40 (see FIG. 7) that are typically found in a plant 20 (see FIG. 2).

The leak monitoring system 100 (see FIG. 1) includes a control unit 200, a first monitoring system 300, and a second monitoring system 400.

Figure 1:
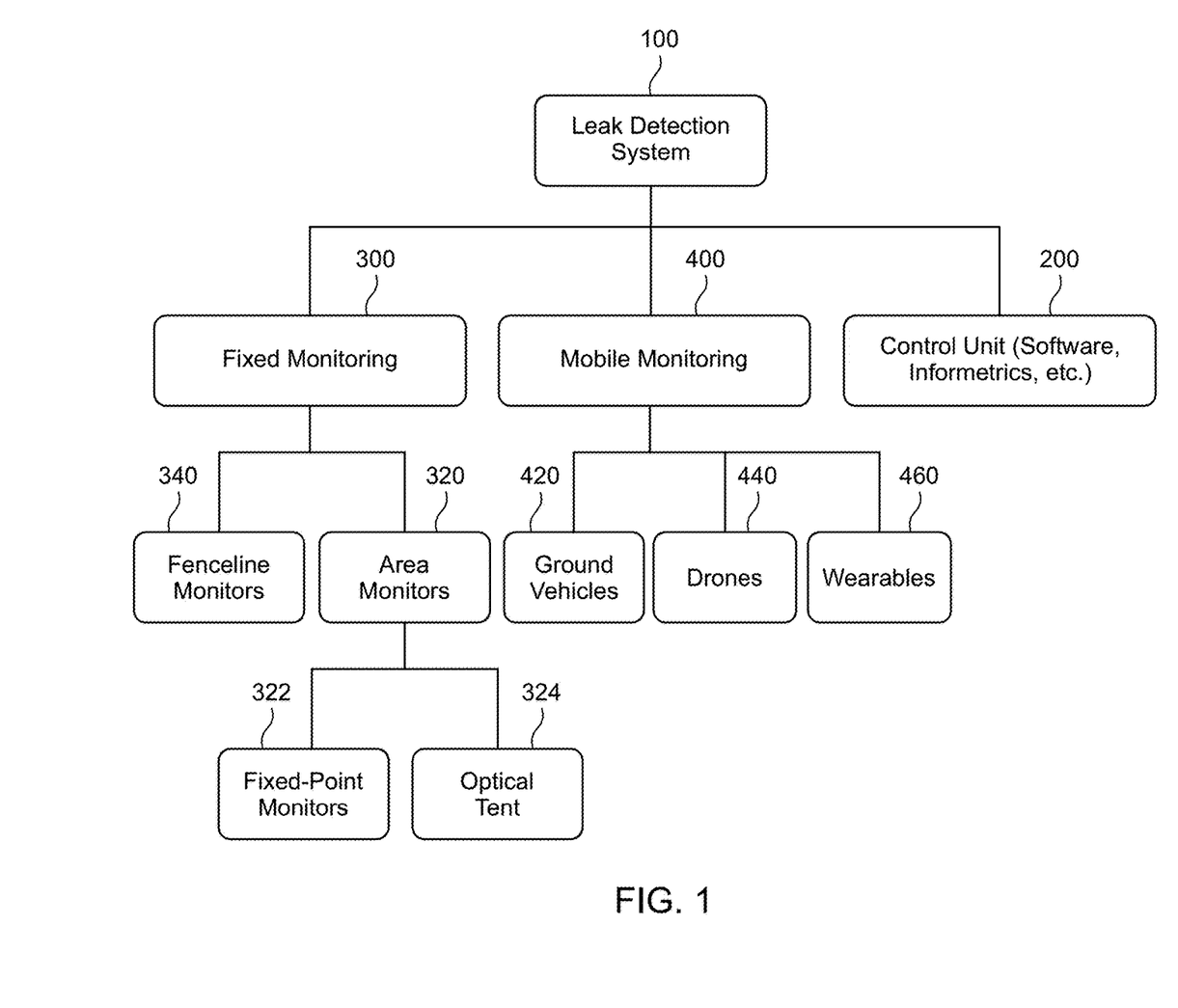
FIG. 1 illustrates an embodiment of a leak monitoring system for use in a plant with a leak monitoring system.

The control unit 200 may be located at the plant 20 or the control unit 200 may be located remote from the plant 20. The control unit 200 communicates with both the first monitoring system 300 and the second monitoring system 400. Further discussion regarding the control unit 200 will be provided below.

The first monitoring system 300 is a fixed monitoring system which preferably includes one or more sensor assemblies 320 and one or more sensor assemblies 340 (see FIG. 1), each of which are fixed in position at the process plant 20.

Figure 4:
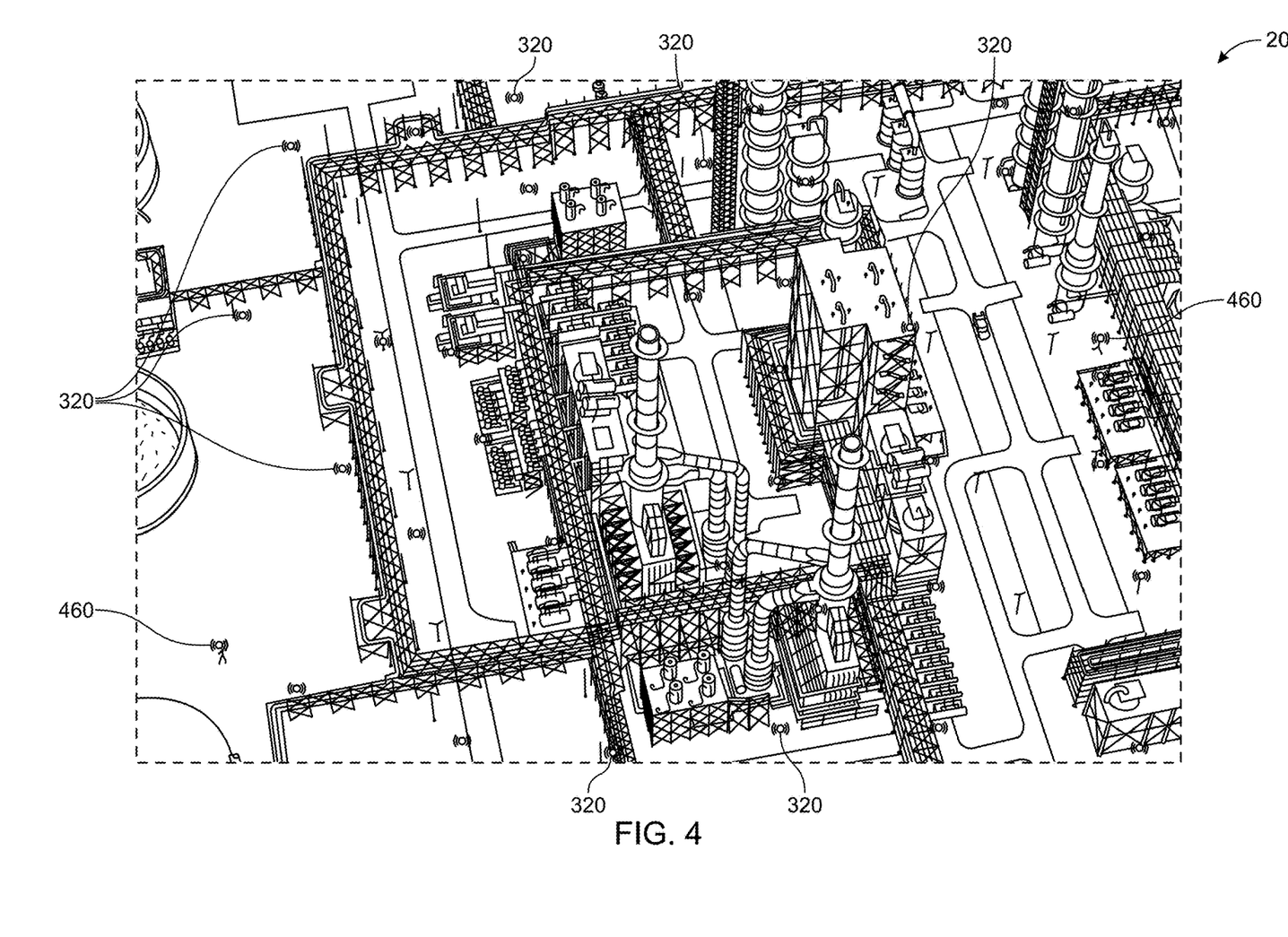
FIG. 4 illustrates an enlarged portion of the plant as illustrated in FIG. 2.

The sensor assemblies 320 are provided as area monitoring units which are strategically located throughout the plant 20 (see FIG. 4). The sensor assemblies 320 thus may be located near various piping systems 40 within the plant 20 and/or may be located near various components 60 within the plant 20. The sensor assemblies 320 will be described in further detail below. The sensor assemblies 320 are preferably comprised of an appropriate number to adequately "cover" the entirety of the piping systems 40 within the plant 20. In other words, the goal would be to have any leak within the plant 20 be detected by at least one of the sensor assemblies 320 of the first monitoring system 300. Preferably, the sensor assemblies 320 would be positioned such that multiple sensor assemblies 320 would detect a leak. In other words, an "overlap" of coverage of the sensor assemblies 320 would ensure reliability of detection. The sensor assemblies 320 may be located at or near ground level or the sensor assemblies 320 may be elevated away from ground level (as many of the components 60 of a piping system 40 may also be so elevated). Each sensor assembly 320 may be wired/wirelessly connected to the control unit 200 in order to provide information regarding the readings of the sensor assembly 320. The control unit 200 is also provided with information regarding the location of each sensor assembly 320.

The sensor assemblies 320 may include any type of appropriate fixed-point sensor 322 which is configured to detect volatile organic compounds VOCs, such as photoionization detector (PID), infrared, catalytic oxidation, electrochemical, a colorimetric sensor, metal oxide semiconductor (MOS)/chemiresistive sensors, a surface acoustic wave sensor, and other types of sensors. Photoionization detectors, for example, are capable of detecting many VOCs down to sub-ppm level. Electrochemical sensors offer ppm resolution to certain types of VOCs. Infrared sensors are very stable and are particularly suitable for long term, unattended operation. They can detect most VOCs due to characteristic infrared absorption of the hydrocarbon compounds.

The sensor assemblies 320 may also include an optical gas monitoring system 324 based on the open-path infrared and/or ultraviolet spectroscopy. Each gas has its own unique fingerprint of electromagnetic energy absorption. By utilizing specific wavelengths, gases in the atmosphere that the beam travels through can be detected based on changes in the intensity of light at one or more of these wavelengths.

Figure 5:
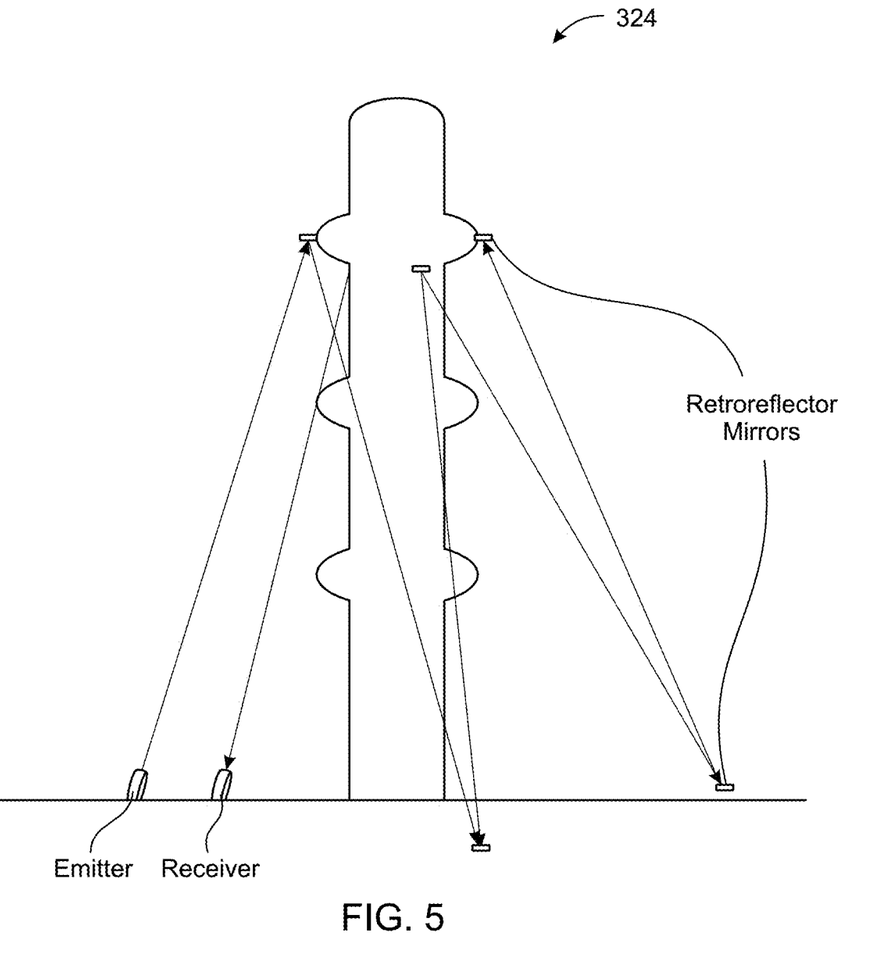
FIG. 5 illustrates an embodiment of an optical gas monitoring system of the leak monitoring system.

FIG. 5 illustrates an example of an open-path optical gas monitoring system 324 where various optical components are configured to form an optical tent. In such a system, a light emitter, a receiver, and multiple beam retroreflector mirrors are placed at strategic locations to route the beam of light around a process unit. Unlike point detectors that detect gases at specific locations, the open path system monitors gas concentrations over the entire range the beam travels, and the distance covered can be as far as hundreds of meters and it is particularly advantageous for high towers or places where the environment is not suitable for the sensor technology used in the fixed point area monitors 322. For example, silicon- or sulfur-containing compounds can poison MOS and catalytic bead based sensors.

In each embodiment, the sensors within the sensor assemblies 320 may be provided with power via hard-wiring to main power or via a battery. If the sensor assemblies 320 require significant power consumption, then hard-wiring to main power would be preferred. However, when operated on battery power, the sensor assemblies 320 may be turned on to perform a gas measurement intermittently, such as at a fixed interval, e.g. every hour, every day, or every week. Sensor assemblies 320 which are battery-powered may be provided with or without a solar panel. A sensor assembly 320 having a non-dispersive infrared sensor, for example, has a start-up time of no more than 1 minute. This means the sensor assembly 320 only needs to operate less than 1 hour each year, assuming the sensor assembly 320 is configured to take a gas reading once per week. Even with 50 mA power draw, one CR2032 lithium battery that has 230 mAh capacity can easily last over 4 years.

The sensor assemblies 320 may be configured to have a sensor housed within a housing, such that the sensor is not readily affected by outdoor environmental conditions, such as wind, rain, and temperature variations.

The sensor assemblies 340 are provided as fence line monitoring units which are strategically located along the outer fenceline (e.g., the boundary) of the plant 20 (see FIG. 2). The sensor assemblies 340 thus may be located distantly from the various piping systems 40 and components 60 within the plant 20. The sensor assemblies 340 will be described in further detail below. The sensor assemblies 340 are preferably comprised of an appropriate number to adequately "cover" at least a portion of, if not the entirety of, the boundary of the plant 20. In other words, the goal would be to have at least one of the sensor assemblies 340 located at pre-defined distances, e.g., every 100 feet along the fenceline boundary of the plant 20. The placement may also be dependent on where the plant 20 is located with respect to local communities and how fenceline monitoring is regulated in the city, county, state where the plant 20 is located. The sensor assemblies 340 may be located at or near ground level or the sensor assemblies 340 may be elevated away from ground level (e.g., at or near the top of the fence). Each sensor assembly 340 may be hard-wired, battery powered, or powered by solar panel, and wired/wirelessly connected to the control unit 200 in order to provide information regarding the readings of the sensor assembly 340. The control unit 200 is also provided with information regarding the location of each sensor assembly 340.

Figure 3:
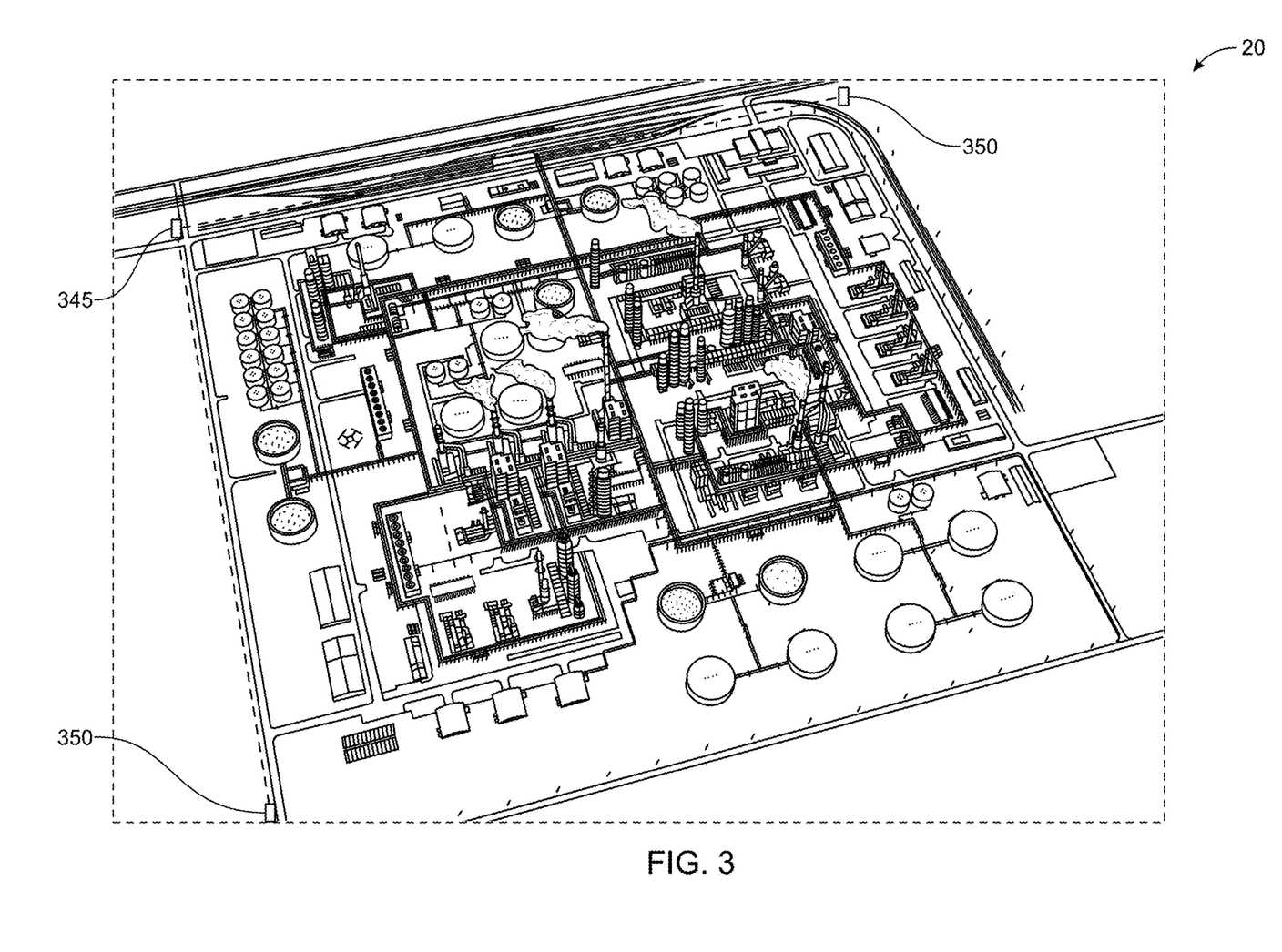
FIG. 3 illustrates the plant of FIG. 1 using an open-path spectrometer of the leak monitoring system for fenceline monitoring.

The sensor assemblies 340 may be identical to the sensor assemblies 320 or may be different from one another. One of the commonly used technologies is the passive sampling tube, where a chemical sorbent is used to collect samples of gases or chemical vapors over a certain period of time, and then sent to an analytical laboratory to analyze the concentrations of specific compounds against predetermined threshold values. Another commonly used technology is the open-path laser spectrometry, which may cover a long distance, e.g. 500 meters, and provide real-time monitoring of gas concentrations over that distance. Examples are Fourier transfer infrared (FT-IR) spectroscopy, tunable diode laser spectroscopy (TDLAS), UV or ultra-UV differential optical absorption spectroscopy ("UV-DOAS"), cavity ring-down spectroscopy ("CRDS"), photoacoustic infrared spectroscopy, and differential absorption light detection and ranging (DIAL) and solar occultation flux (SOF). Each technology has its own advantages. The UV absorption spectroscopy, for example, is particularly sensitive and selective toward aromatic compounds such as benzene, toluene, ethylbenzene and xylenes (BTEX), while infrared absorption-based spectroscopy is more suitable for detecting methane and other alkane compounds in the mid and near infrared region. FIG. 3 illustrates one type of a sensor assembly 340, namely an open-path monitoring system having a spectrometer 345 and at least one retro-reflector 350 that returns a laser beam back to the spectrometer 345 for measurements. FIG. 3 illustrates a single spectrometer 345 used with two retro-reflectors 350 to cover two sides of the plant 20.

The second monitoring system 400 is a mobile monitoring system which preferably includes one or more sensor assemblies 420, one or more sensor assemblies 440, and one or more sensor assemblies 460 (see FIG. 1), each of which are operable in a mobile condition as they are moved around the plant 20. For example, the mobile sensor may comprise sensor assemblies affixed to manned vehicles, unmanned vehicles, fixed track vehicle systems, unmanned aerial vehicles (UAVs), wearables, or other movable apparatus. The fixed track vehicle system may resemble a tram or trolley car that follows a pre-set track—the track may be a physical track or a virtual track.

The sensor assemblies 420 are utilized in association with ground vehicles that traverse the areas within the plant 20 (see FIGS. 2 and 4). Such ground vehicles can include trucks, golf carts or other maintenance vehicles typically used within the plant 20. The sensor assemblies 420 can be affixed to the ground vehicles such that when a ground vehicle moves about the plant 20, the sensor assemblies 420 can collect information regarding the detection of VOCs, but also regarding their respective locations within the plant 20 when VOCs are detected. FIG. 2 illustrates a ground vehicle having a sensor assembly 420 moving about the plant 20 and provides an image 430 of the detection of VOCs along its path, where 430a indicates low/acceptable levels of VOCs and 430c indicates high/unacceptable levels of VOCs and 430b indicates levels of VOCs in between. The sensor assemblies 420 associated with the ground vehicles may collect data at any time, regardless of whether the ground vehicle is parked or moving, regardless of whether the ground vehicle is purposely dispatched to drive a specified route through the plant 20, and regardless of whether the ground vehicle is dispatched to a specific location within the plant 20.

Each sensor assembly 420 is preferably wirelessly connected to the control unit 200 in order to provide information regarding the readings of the sensor assembly 420, but alternatively the sensor assembly 420 may store the information that it collects and may periodically be wired to the control unit 200 in order to have its information uploaded to the control unit 200.

The sensor assemblies 420 may be identical to or different from the sensor assemblies 320, 340. The sensor assemblies 420 may comprise or include freshly calibrated laboratory analyzers which are not suitable for use in the sensor assemblies 320, 340. Examples are cavity ring down spectrometer (CRDS) which detects methane and some other hydrocarbon compounds down to parts per trillion (ppt) levels. A ground vehicle may utilize multiple sensor assemblies 420 which are each configured to detect different types of VOCs, or which are each configured with different types of sensors used for detecting the same types of VOCs at different levels of concentrations.

The sensor assemblies 440 are utilized in association with unmanned aerial vehicles (e.g., drones) that fly over the areas within the plant 20 (see FIG. 2). The sensor assemblies 440 can be affixed to the drones such that when drones fly above the plant 20, the sensor assemblies 440 can collect information regarding the detection of VOCs, but also regarding their respective locations within the plant 20 when VOCs are detected. The sensor assemblies 440 associated with the drones may collect data when the drone is purposely dispatched to fly a specified route over the plant 20, or when the drone is dispatched to a specific high location within the plant 20, e.g., where components 60 are located in a high tower of the piping system 40. Alternatively, the sensor assemblies 440 with drones may fly along the fence lines and scan the plant using remote optical sensing technologies such as laser and forward locking IR (FLIR) gas imaging cameras.

Each sensor assembly 440 is preferably wirelessly connected to the control unit 200 in order to provide information regarding the readings of the sensor assembly 440, but alternatively the sensor assembly 440 may store the information that it collects and may periodically be wired to the control unit 200 in order to have its information uploaded to the control unit 200.

The sensor assemblies 440 may be identical to or different from the sensor assemblies 320, 340, 420. The sensor assemblies 440 may comprise or include freshly calibrated laboratory analyzers which are not suitable for use in the sensor assemblies 320, 340. A drone may utilize multiple sensor assemblies 440 which are each configured to detect different types of VOCs, or which are each configured with different types of sensors used for detecting the same types of VOCs at different levels of concentrations. As an example, the sensor assemblies 440 may be specially configured to detect light gases (e.g., gases that are lighter than air) or gases from high temperatures.

The sensor assemblies 460 are utilized in association with wearable monitors that are donned by personnel who work within the plant 20 (see FIG. 4). It is typical, if not required, for personnel who work within the plant 20 to wear monitors that will detect the presence of hazardous gases and, upon one or more gases approaching a predetermined level, e.g., 1 ppm for benzene, the monitor will issue an alarm, which alarm may be one or more of visual, audio, and haptic. Upon such an alarm being issued, the personnel wearing the monitor will be alerted to possible unsafe conditions in the area.

Such monitors can be configured to detect VOCs lower than those that will cause the alarm to issue. Thus, when the sensor assemblies 460 are worn by personnel, such that when personnel move about the plant 20, the sensor assemblies 460 can collect information regarding the detection of VOCs, but also regarding their respective locations within the plant 20 when VOCs are detected, which may occur by the sensor assemblies 460 having GPS capabilities, or by having the personnel "badge in" to a certain location, e.g., a process unit, within the plant 20, such that the general location of the personnel can be identified.

Each sensor assembly 460 is preferably wirelessly connected to the control unit 200 in order to provide information regarding the readings of the sensor assembly 460, but alternatively the sensor assembly 460 may store the information that it collects and may periodically be wired to the control unit 200 in order to have its information uploaded to the control unit 200.

There can be two-way communications between personal wear monitors and the central control systems. If, for example, a particular area is flagged for unsafe conditions based on informetrics or data provided by other sensors, an alarm or alert can be issued to the employee who attempts to enter or approach this area through the personal wear monitor. The sensor assemblies 460 may be identical to or different from the sensor assemblies 320, 340, 420, 440.

The first and second monitoring systems 300, 400 thus provide multiple layers of information regarding VOC detection within the plant 20 to the control unit 200. The first (fixed) monitoring system 300 provides information regarding the detection of VOCs at their fixed locations (which are known to the control unit 200). The second (mobile) monitoring system 400 provides information regarding both the detection of VOCs and the location of the sensor assemblies 420, 440, 460 when such VOCs are detected. Obviously, there may be overlap in the VOC detection by the first and second monitoring systems 300, 400, which overlap can be processed by the control unit 200 in order to aid in pinpointing the location of the leak.

As an example, if one of the sensor assemblies 320 is located 10 feet to the North of a component 60 that has a VOC leak, and one of the sensor assemblies 340 is located 50 feet to the North of the component 60, and each detects the VOC, but the sensor assembly 320 detects a higher VOC level than does the sensor assembly 340, the control unit 200 can predict that the component is located to the South of both the sensor assemblies 320, 340. Further information provided by other sensor assemblies 320, 340 or by the second monitoring system 400 will further aid the control unit 200 in predicting the location of the component that has the VOC leak.

Further to the multiple layers of sensor assemblies 320, 340, 420, 440, 460 utilized in the leak monitoring system 100, the control unit 200 is provided with informetrics and a dashboard software platform to further aid in predicting and identifying the location of components 60 that have VOC leaks.

The informetrics provided to the control unit 200 essentially involves any information that can be utilized by the control unit 200, that is not provided by any of the sensor assemblies 320, 340, 420, 440, 460, to aid in predicting and identifying the location of components 60 that have VOC leaks. The informetrics may be added to the control unit 200 and utilized by the dashboard software platform.

The informetrics may include meteorological data. Meteorological data may include historical data regarding temperature, humidity, wind, pressure, etc. and could further include predicted data regarding same.

The informetrics may include information regarding the plant 20 and any associated maintenance activities. As an example, the informetrics may provide information regarding certain times where emissions from traffic may be high (so as to avoid the possibility of false positives). The informetrics may also provide information regarding known/anticipated unusual weather conditions. The informetrics may further provide information regarding other new input values from the administrator.

The informetrics may include information regarding known probabilities of components in the area. As an example of probability, if it is known in a certain process plant that pumps have a greater leak probability than valves which, in turn, have a greater leak probability than connectors, such information could be provided to the control unit 200. As another example, information regarding the age of the different components in the process plant 20 could be provided, as it is likely that older components will have a higher leak probability than newer components. As another example, information regarding history of leaks could be provided to the control unit 200, e.g., it is more likely that leaks will occur from past leaking components. As another example, information regarding high temperature, high pressure and/or vibrating components could be provided to the control unit 200, e.g., it is more likely that high temperature, high pressure and/or vibrating components are likely to leak. Informetrics provided to the control unit 200 may also relate to the types of gases that are likely to be leaked at the process plant. For example, different gases have different response factors, e.g., PID sensors, have high sensitivities to aromatic compounds, but are less sensitive to light hydrocarbon compounds. If a sensor assembly shows a detect in an area where different chemicals are used in the pipelines, the chemicals that are more detectable by the sensor assembly that detected same are more likely to the chemicals which are leaking and, therefore, components connected to such chemicals are more likely to be the leak source.

Many plants have a plant information (PI) management system designed for plant-wide monitoring and analysis. Temperature, pressure, fluid viscosity and velocity, chemical compositions and concentrations etc. are monitored and analyzed on a continuous basis. One or more of these systems can be tied in to the current system to provide informetrics real time.

The informetrics may include information regarding gas dispersion models built and improved over time based on prior data and analysis.

The informetrics may include information regarding advanced analytics including algorithms on how to calculate gas detection signals in a noisy baseline situation, how to determine when to send an alert and/or notification, and where the leak is most likely to come from. The informetrics of the control unit 200 improve accuracy of the identification of the location of the VOC leak by analyzing information such as meteorological data. Then, the control unit 200 triggers an alert to cause a protocol to be implemented. The alert comprises both a level of detection and the location of the VOC leak in the plant. The level of detection is based on whether more or less than a threshold level of VOC gas has been detected. The level of detection is different than 430*a*, 430*b*, 430*c* illustrated in FIG. 2, which is from a ground vehicle moving about the plant. Rather, the level of detection in the alert is an output of the informetrics and dashboard software platform of the control unit 200 after the accuracy of the identification of the location of the VOC leak is improved by analyzing information including meteorological data. Based on the level of detection, the appropriate team and equipment is prioritized and dispatched. In other words, the protocol is dictated by the level of detection in the alert—i.e., the protocol determines and dispatches appropriate equipment to the location of the VOC leak based on the alert and to investigate an emissions event in a proximity of the location. For example, if the level of detection is high, then a human technician may be immediately dispatched to investigate the area of the VOC leak. Moreover, the level of detection may dictate the type of equipment, thus ensuring that the technician is properly supplied before being dispatched. The technician may be equipped with a regular, handheld VOC gas detection device when the level of detection in the alert is high. However, if the level of detection is low, then the control unit 200 may schedule a later time at which the area of the VOC leak will be investigated. And, a highly sensitive gas sniffer device to detect VOC gas may be prepared for use. Based on level of detection in the alert, the work of the inspection team is prioritized. For example, if an inspector visits the location in the plant and determines that the emission event is caused by a truck's exhaust while parked in the area with its engine turned on, then the protocol may cause nothing more to happen. Instead, if an actual VOC leak is suspected, then the protocol may result in the control unit 200 sending a request for a maintenance team to be dispatched to the location in the plant to repair the leak. The protocol may be implemented by the central cloud control unit and/or in combination with a handheld monitoring device—e.g., the central cloud control unit may issue a command that causes deployment of a technician to the location of the leak in the plant to pinpoint the leak and/or investigate a possible temporary cause of the leak. The central cloud control unit comprises a computer processor and computer memory that stores computer-executable instructions, that when executed by the processor, cause the central cloud control unit to perform the aforementioned method steps.

Thus, the control unit 200, upon receiving information from the first and/or second monitoring systems 300, 400 regarding the detection of a VOC, will analyze the information provided by the first and/or second monitoring systems 300, 400 in view of the known informetrics previously stored within the control unit 200 in order to identify and pinpoint (as specifically as possible) the location of the component 60 that has a leak. Upon identifying and pinpointing the location of the leak, the control unit 200 can issue an alert which will result in having a technician being deployed to the identified location in order to specifically pinpoint the exact component 60 that has developed the leak. Once the leak is located, the same actions currently taken after the location of a leak using Method 21 would be instituted.

While there are a lot of value of being able to quickly identify the leaking components, pinpointing the location of the leak source remains a significant challenge due to the fact that sensor detection signals are affected by so many geospatial and temporal elements including leak size, wind conditions, sensor distance and elevations and impedance in the plant. Bayesian inference is especially useful in this application. As more evidence or information becomes available, Bayesian inference computes the posterior probability based on a prior probability and a likelihood function derived from a statistical model for the observed data, and continuously updates its leak probability distribution map which makes prediction of leak locations sharper and more reliable.

The informetrics may include information regarding known emissions impact (weight) of components in the area, which could allow the control unit 200, in a multiple leak situation, to determine the priority in which the multiple leaks should be pinpointed/located and ultimately repaired. As an example of weight, some process units have chemical compounds that weigh more in emissions impact even if at the same leak rate and some components have more emissions impact even when Method 21 measurements are the same. As such, the weight may affect the decision regarding repair priority.

The informetrics may also include satellite data of atmospheric pollutions over the plant 20, or other satellite data such as weather conditions at the plant 20.

Overall, this leak monitoring system 100 will work to more effectively and more efficiently identify leaks within a plant 20. The leak monitoring system 100 is more likely to identify a leak in real time, or at least within a short time period after the leak has occurred than Method 21 (which, because of its regimented routine, may not detect a leak for days/weeks/months).

The control unit 200 will also have the ability to be constantly learning in order to better predict the existence/location of leaks.

The control unit 200 and the sensor assemblies 320, 340, 420, 440, 460 are all preferably a part of a sensor network, preferably a wireless sensor network, which operate together as a network of end nodes communicating information gathered from sensor locations through wireless links. The data from the nodes, e.g., the sensor assemblies 320, 340, 420, 440, 460, can be forwarded directly to a gateway (not shown), or through multiple end nodes to the gateway. The gateway may be connected to other devices or networks such as a wired or wireless Ethernet backbone to relay sensor information to the control unit 200. The sensor network end nodes may be organized by any suitable topology, such as, for instance, a Star topology or a Mesh topology.

Figure 6:
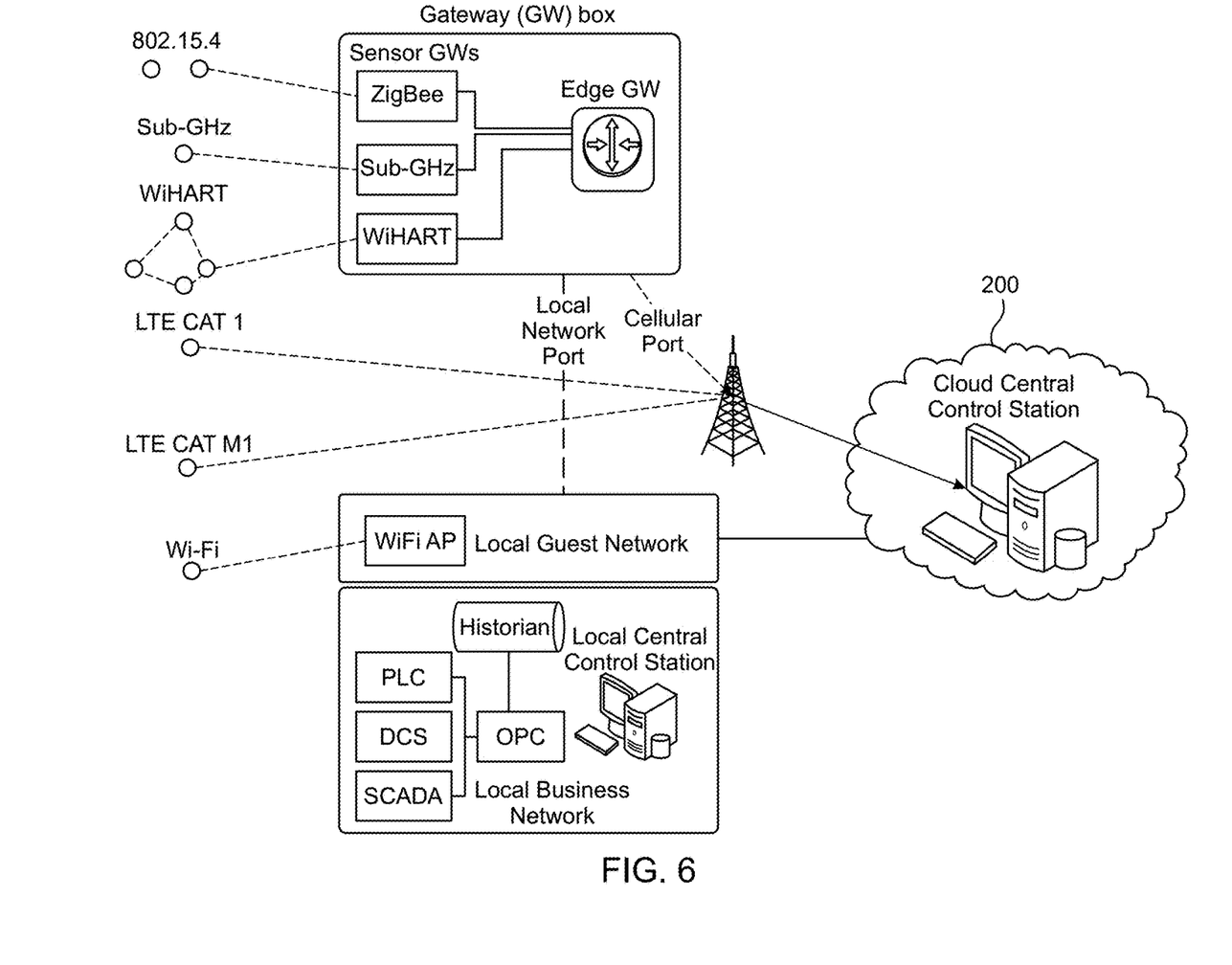
FIG. 6 illustrates an embodiment of a connectivity solution for the transport of sensory data to a local or Cloud central control station.

As illustrated in FIG. 6, various connectivity solutions can be envisioned for the transport of sensory data to a local or Cloud central control station (CCS). In order to reach the local CCS, sensor data is often aggregated at a Gateway located on the premises of the plant 20. This Gateway is usually mains powered and equipped with a cellular or local backhaul connection. The local backhaul connection connects the gateway via the existing local infrastructure such as Wi-Fi or Ethernet to the plant business network (DCS, etc.). If a Cloud CCS is in mind, gateways can connect to the Cloud via their 3G/4G cellular backhaul connection. Alternatively sensor devices can directly connect to the cell tower and to the Cloud using LTE CAT1 (or CAT-M1) modems.

A multitude of sensor-to-gateway wireless technologies can be utilized for different use cases. Wireless mesh networks (such as WirelessHART and/or ZigBee) can be used to relay sensor data among a plurality of sensing devices on its route to the gateway. This can be used where reliability of communications in the harsh RF environment is of higher priority. Alternatively, longer range transmissions in Sub-GHz can be utilized to reach further away sensors. Moreover, sensors equipped with Wi-Fi modems acting as clients can directly connect to the plant's Wi-Fi Access Points. The required data rate, power consumption, and other metrics may influence the sensor-to-gateway wireless technology selection.

The sensor assemblies 320, 340, 420, 440, 460 may each be powered by non-rechargeable batteries or may be powered by rechargeable batteries and/or energy harvesting.

Figure 8:
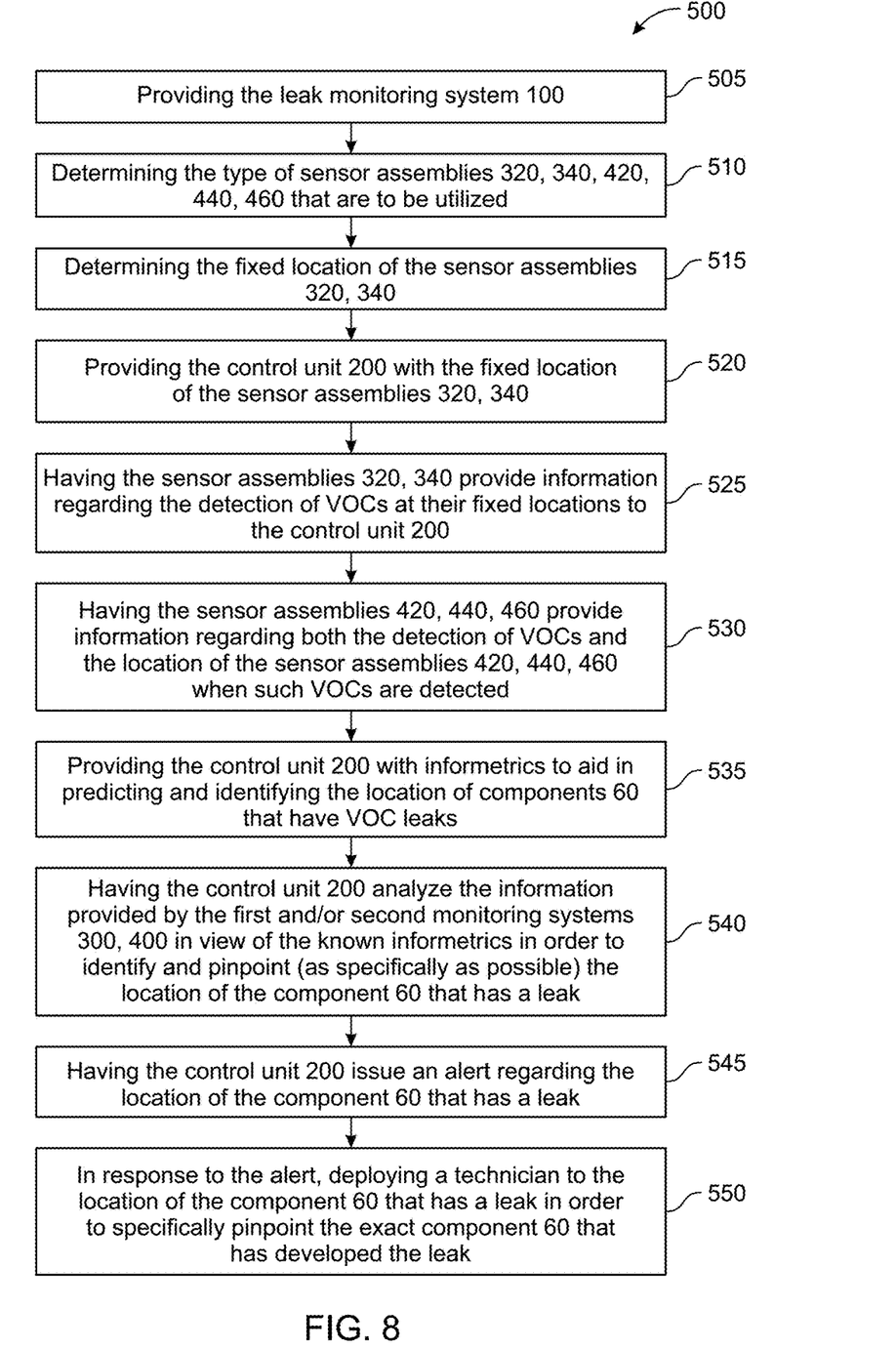
FIG. 8 illustrates a flow chart of a method of detecting leaks occurring at various components of piping systems that are typically found in the plant illustrated in FIG. 2.

The present disclosure further provides an embodiment of a method 500 of detecting leaks occurring at various components 60 of piping systems 40 that are typically found in a plant 20 (see FIG. 8).

The method 500 includes the step 505 of providing the leak monitoring system 100 that includes the control unit 200, the first monitoring system 300, and the second monitoring system 400, where the control unit 200 is configured to communicate with both the first monitoring system 300 and the second monitoring system 400, where the first monitoring system 300 includes one or more sensor assemblies 320 and one or more sensor assemblies 340, each of which are fixed in position at the plant 20, and where the second monitoring system 400 includes one or more sensor assemblies 420, one or more sensor assemblies 440, and one or more sensor assemblies 460, each of which are operable in a mobile condition as they are moved around the plant 20.

The method 500 includes the step 510 of determining the type of sensor assemblies 320, 340, 420, 440, 460 that are to be utilized.

The method 500 includes the step 515 of determining the fixed location of the sensor assemblies 320, 340.

The method 500 includes the step 520 of providing the control unit 200 with the fixed location of the sensor assemblies 320, 340.

The method 500 includes the step 525 of having the sensor assemblies 320, 340 of the first monitoring system 300 provide information regarding the detection of VOCs at their fixed locations to the control unit 200.

The method 500 includes the step 530 of having the sensor assemblies 420, 440, 460 of the second monitoring system 400 provide information regarding both the detection of VOCs and the location of the sensor assemblies 420, 440, 460 when such VOCs are detected.

The method 500 includes the step 535 of providing the control unit 200 with informetrics, namely any information that can be utilized by the control unit 200, that is not provided by any of the sensor assemblies 320, 340, 420, 440, 460, to aid in predicting and identifying the location of components 60 that have VOC leaks.

The method 500 includes the step 540 of having the control unit 200 analyze the information provided by the first and/or second monitoring systems 300, 400 in view of the known informetrics in order to identify and pinpoint (as specifically as possible) the location of the component 60 that has a leak.

The method 500 includes the step 545 of having the control unit 200 issue an alert regarding the location of the component 60 that has a leak.

The method 500 includes the step 550 of, in response to the alert, deploying a technician to the location of the component 60 that has a leak in order to specifically pinpoint the exact component 60 that has developed the leak.

While the main objective of the invention is to detect and identify gas leaks, the system can also provide an estimation of the total emissions over time. The gas concentrations at different locations measured by a sensor array in a 3D space represent gas distribution in the plant, and this information can be used to construct a gas map at any given time, thus allowing for estimation of the total size of the emissions via pre-established gas distribution models built in the software.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

We claim:

1. A volatile organic compounds (VOC) leak monitoring system with improved prediction accuracy, the system comprising:
   - a1. a first monitoring system comprising a plurality of fixed-point sensors configured to measure a first quantified level of a first detection present of gas created by a VOC leak in a plant comprising an outdoor area;
   - a2. a second monitoring system comprising a plurality of mobile sensors configured to measure a second quantified level of a second detection present of the gas created by the VOC leak in the plant comprising the outdoor area, wherein the plurality of mobile sensors and the plurality of fixed-point sensors overlap in coverage;
   - b. a computer server comprising informetrics and a dashboard software platform, wherein the first monitoring system at a first location in the plant and the second monitoring system at a second location in the plant are configured to transport information about the measuring of the first and the second quantified levels of the first and the second detections of the gas from the VOC leak to the computer server, and wherein the computer server is configured to:
     - i. analyze together the information provided by the first monitoring system and the second monitoring system to identify, with the improved prediction accuracy, a predicted pin-point location of the gas from the VOC leak in the plant that is a third location in the overlap in the coverage but different from the first location and different from the second location;
     - ii. identify the predicted pin-point location of the gas from the VOC leak with the improved prediction accuracy by analyzing the informetrics comprising at least meteorological data; and
     - iii. issue an alert comprising the first and the second quantified levels of the first and the second detections and the predicted pin-point location of the gas from the VOC leak; and
   - c. a protocol to determine and dispatch manually operated equipment to the predicted pin-point location of the gas from the VOC leak based on the alert and to investigate an emissions event in a proximity of the predicted pin-point location, wherein the second monitoring system does not include the manually operated equipment.

2. The system of claim 1, wherein the plurality of fixed-point sensors comprise area monitors and fenceline monitors, and wherein the plurality of mobile sensors comprise sensor assemblies affixed to at least one of manned vehicles, unmanned vehicles, fixed track vehicle systems, unmanned aerial vehicles, and wearables, and wherein the computer server is configured to identify the predicted pin-point location of the gas from the VOC leak in the plant using the overlap in the coverage.

3. The system of claim 1, wherein the meteorological data comprises wind conditions of the outdoor area.

4. The system of claim 3, wherein the plurality of fixed-point sensors comprise one or more of a flame ionization detector (FID), a photoionization detector (PID), infrared, deep-UV, catalytic oxidation, electrochemical, a colorimetric sensor, metal oxide semiconductor (MOS)/chemiresistive sensors, and a surface acoustic wave sensor.

5. The system of claim 3, wherein the plurality of fixed-point sensors comprise an open-path optical gas monitoring system comprising:
   - a. a light emitter configured to emit a beam;
   - b. a receiver configured to receive the beam; and
   - c. at least one beam retroreflector mirror to redirect the beam,
   wherein the open-path optical gas monitoring system forms an optical tent that monitors gas concentrations over an entire range that the beam travels.

6. The system of claim 3, wherein the plurality of fixed-point sensors comprise area monitors.

7. The system of claim 6, wherein the area monitors are located throughout the plant and elevated above ground level in the plant.

8. The system of claim 6, wherein the area monitors comprise an optical gas monitoring system based on spectroscopy, wherein the optical gas monitoring system emits a beam that detects, based on changes in intensity of light at specific wavelengths, a fingerprint of electromagnetic energy absorption of the gas from the VOC leak.

9. The system of claim 3, wherein the plurality of fixed-point sensors comprise fenceline monitors.

10. The system of claim 9, wherein the fenceline monitors are located along an outer boundary of the plant at predefined distances along the outer boundary.

11. The system of claim 9, wherein the fenceline monitors comprise an open-path laser spectrometry system configured to provide real-time monitoring of VOC gas concentrations over a distance, wherein the open-path laser spectrometry system uses one or more of Fourier transfer infrared spectroscopy, tunable diode laser spectroscopy, ultraviolet differential optical absorption spectroscopy, cavity ring-down spectroscopy, photoacoustic infrared spectroscopy, and differential absorption light detection and ranging, and solar occultation flux.

12. The system of claim 1, wherein the meteorological data comprises wind conditions.

13. The system of claim 12, wherein the plurality of mobile sensors comprise sensor assemblies affixed to at least one of manned vehicles, unmanned vehicles, fixed track vehicle systems, unmanned aerial vehicles, and wearables.

14. The system of claim 13, wherein the sensor assemblies are configured to measure the first and the second quantified levels of the first and the second detections of the gas from the VOC leak and record a location of the sensor assemblies at a time of said measuring the first and the second quantified levels of the first and the second detections of the gas, wherein said measuring the first and the second quantified levels of the first and the second detections of the gas occurs regardless of whether the sensor assemblies are moving or stationary.

15. The system of claim 13, wherein the sensor assemblies are affixed to an unmanned aerial vehicle configured to fly above the outdoor area of the plant to measure VOC gas and a respective location of the measurement of the VOC gas.

16. The system of claim 13, wherein the sensor assemblies are affixed to a wearable monitor configured to be donned by plant personnel to detect VOC gas, the wearable monitor comprising:
   - a. a location tracking device configured to record a respective location of the detection of the VOC gas;
   - b. an alarm configured to issue at least one of a visual, audio, and haptic indication upon the detection of the VOC gas; and c. a wireless component configured to wirelessly communicate with the computer server comprising a control unit.

17. The system of claim 1, wherein the meteorological data comprises one or more of historical temperature data, historical humidity data, historical wind data, and historical pressure data.

18. The system of claim 1, wherein the computer server is communicatively coupled to a plant information system configured to provide real-time informetrics, wherein the real-time informetrics comprises one or more of measurements of temperature, pressure, fluid viscosity, and velocity.

19. A method for monitoring a plant for a volatile organic compound (VOC) leak, the method comprising:
   a. providing the plant with a plurality of sensors, wherein the plurality of sensors comprise a fixed-point sensor and a mobile sensor;
   b1. measuring, by the fixed-point sensor of the plurality of sensors, at a first location a first quantified level of a first detection present of gas created by the VOC leak in the plant comprising an outdoor area;
   b2. measuring, in an overlap in coverage by the mobile sensor of the plurality of sensors, at a second location a second quantified level of a second detection present of the gas created by the VOC leak in the plant;
   c. transporting information, by the plurality of sensors, to a computer server about the measuring of the gas from the VOC leak in the plant of the step b1 and the step b2;
   d. analyzing, by the computer server, the information provided by the plurality of sensors in the step b1 to identify a predicted location of the gas from the VOC leak in the plant;
   e. improving accuracy, by the computer server, of the identification of the predicted location of the gas from the VOC leak by analyzing informetrics comprising at least meteorological data of the outdoor area, wherein the predicted location of the gas from the VOC leak is different from the first location and is different from the second location, and wherein the predicted location is in the overlap in the coverage;
   f. generating an alert comprising at least one of a visual, audio, and haptic indication upon the identification of the predicted location of the gas from the VOC leak, wherein the alert comprises the first and the second quantified levels of the first and the second detections and the predicted location of the gas from the VOC leak; and
   g. based on the generated alert, determine and dispatch, pursuant to a protocol, manually operated equipment to the predicted location of the gas from the VOC leak and investigate an emission event in a proximity of the predicted location, wherein the mobile sensor of the plurality of sensors does not include the manually operated equipment.

20. The method of claim 19, wherein the computer server comprises the informetrics and a dashboard software platform, and wherein the meteorological data comprises one or more of historical temperature data, historical humidity data, historical wind data, and historical pressure data.

21. The method of claim 20, wherein the informetrics comprises plant maintenance data.

22. The method of claim 20, wherein the mobile sensor comprise sensor assemblies affixed to at least one of manned vehicles, unmanned vehicles, fixed track vehicle systems, unmanned aerial vehicles, and wearables, and the method further comprising:
   i. recording a location of a the mobile sensor at the measuring of the first and the second quantified levels of the first and the second detections of the gas created by the VOC leak in the plant.

23. A tangible, non-transitory computer-readable medium storing computer-executable instructions that, when executed by a computer server comprising informetrics and a dashboard software platform, cause a volatile organic compounds (VOC) leak monitoring system to:
   a. analyze information provided by a plurality of sensors, wherein the plurality of sensors are configured to measure a first quantified level of a first detection present of gas created by a VOC leak at a first location and to measure a second quantified level of a second detection present of the gas created by the VOC leak at a second location in a plant comprising an outdoor area, wherein the plurality of sensors comprise a fixed-point sensor and a mobile sensor having overlapping coverage, wherein the fixed-point sensor is at the first location and the mobile sensor is at the second location;
   b. identify a predicted location of the gas from the VOC leak in the plant;
   c. improve accuracy of the identification of the predicted location of the gas from the VOC leak in the plant by analyzing the informetrics comprising at least meteorological data of the outdoor area, wherein the predicted location of the gas from the VOC leak is in the overlapping coverage but different from the first location and different from the second location;
   d. generate an alert comprising at least one of a visual, audio, and haptic indication upon the identification of the predicted location of the gas from the VOC leak, wherein the alert comprises the first and the second quantified levels of the first and the second detections of the gas from the VOC leak and the predicted location of the gas from the VOC leak; and
   e. based on the generated alert, determine and dispatch, pursuant to a protocol, manually operated equipment to the predicted location of the gas from the VOC leak and investigate an emission event in a proximity of the predicted location, wherein the mobile sensor of the plurality of sensors does not include the manually operated equipment.

24. The tangible, non-transitory computer-readable medium of claim 23, wherein the informetrics comprises the meteorological data comprising one or more of historical temperature data, historical humidity data, historical wind data, and historical pressure data.

* * * * *